United States Patent
Tsao

(10) Patent No.: US 7,044,121 B1
(45) Date of Patent: May 16, 2006

(54) CUTTING MECHANISM MINUTE ADJUSTMENT DEVICE FOR A STONE CUTTER

(76) Inventor: Wen-Hai Tsao, P.O. Box 697, Feng-Yuan City, Taichung Hsien (TW), 420

( * ) Notice: Subject to any disclaimer, the term of this patent is extended or adjusted under 35 U.S.C. 154(b) by 403 days.

(21) Appl. No.: 10/740,480

(22) Filed: Dec. 22, 2003

(51) Int. Cl.
*B28D 1/04* (2006.01)

(52) U.S. Cl. .................. 125/36; 125/13.01; 125/35
(58) Field of Classification Search ............. 125/13.01, 125/35, 13, 36, 135; 451/340, 455, 450, 461, 451/488; 73/865.9, 862.541; 30/388, 390, 30/391; 29/404
See application file for complete search history.

(56) References Cited

U.S. PATENT DOCUMENTS 2,682,262 A * 6/1954 Schultz .................... 125/13.03
4,446,845 A * 5/1984 Harding .................... 125/13.03
5,689,072 A * 11/1997 Chiuminatta et al. .. 73/862.541
6,494,198 B1 * 12/2002 Chen ........................ 125/13.01
6,637,424 B1 * 10/2003 Fuhrman et al. .............. 125/35

* cited by examiner

*Primary Examiner*—Lee D. Wilson
*Assistant Examiner*—Anthony Ojini

(57) ABSTRACT

A cutting mechanism minute adjustment device for a stone cutter includes a framed base having a hollow interior rectangular support arm on a front corner including a sustaining plate fixed therein inserted into a rectangular receiving spaced under a left portion of a cutting mechanism with a L-shaped adjustable plate engaged therebetween. The adjustable plate has a rectangular through holes for passing through the support arm and a pair of adjustable slots engaged with a pair of screw holes under the cutting mechanism and releasably secured by a pair screws. The cutting mechanism further has a circular blade on a right side actuated by a motor therein and a screw hole in a left wall communicating to the rectangular space and a U-shaped slit in a top of the support arm. A lock has a threaded shank on front engaged into the screw hole and the receiving space of the cutting mechanism through the U-shaped slit of the support arm.

1 Claim, 9 Drawing Sheets

CUTTING MECHANISM MINUTE ADJUSTMENT DEVICE FOR A STONE CUTTER

BACKGROUND OF THE INVENTION

The present invention relates to stone cutter and more particularly to a cutting mechanism minute adjustment device for stone cutter.

A portable stone cutter is of a separate structure which may be easily assembled to provide convenience to the users. However, this type of stone cutter, after repeated assembly and disassembly will be structurally deformed to cause that the blade does not exactly perpendicular to the surface of a stone. Although the blade is adjustable. But the balancement of the cutting mechanism is the most important cause. If the cutting mechanism is not at a correct position the blade is not easily adjusted or calibrated. The cutting mechanism in a conventional portable stone cutter could only permit to conduct vertical adjustment and could not perform minute adjustment.

SUMMARY OF THE PRESENT INVENTION

The present invention has a main object is to provide a cutting mechanism adjustment device for a stone cutter in which the cutting mechanism can be horizontally and minutely adjusted and the blade can be vertically calibrated. The adjustment and calibration are very convenient to do.

Accordingly, the cutting mechanism minute adjustment device for a stone cutter of the present invention comprises generally a framed base, a hollow interior support arm projected upward from a font corner of the base and inserted into a receiving space under a cutting mechanism. The support arm has a U-shaped slit in a upper portion and a screw hole in a middle portion. The receiving space has a screw hole engageable with the U-shaped slit and secured by an adjustable lock which includes a swivel handle. A sustaining plate having a transverse portion on the top inserts into the support arm and secured by a screw. An adjustable plate disposes under the receiving space and secured by screw and has a pair of adjustable slots and a rectangular hole for permitting the support arm passing through. The adjustable lock is acted as a pivotal center and the two adjustable slots can do a lateral displacement of rectangular hole of the adjustable plate to minute adjust the horizontal positions for the cutting mechanism and the vertical calibrations for the blade. The adjustment is very rapid and convenient.

The present invention will become more fully understood by reference to the following detailed description thereof when read in conjunction with the attached drawings.

DETAILED DESCRIPTION OF THE PREFERRED EMBODIMENT

Figure 1:
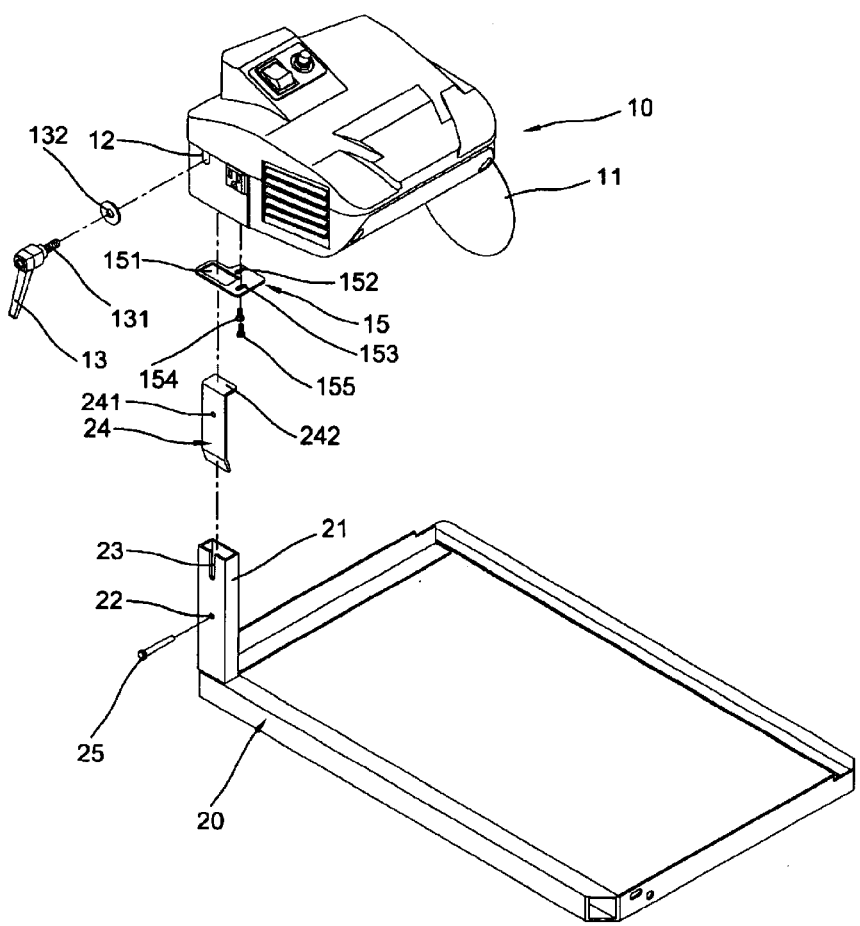
FIG. 1 is an exploded perspective view of the stone cutter of the preferred embodiment of the present invention.
Figure 2:
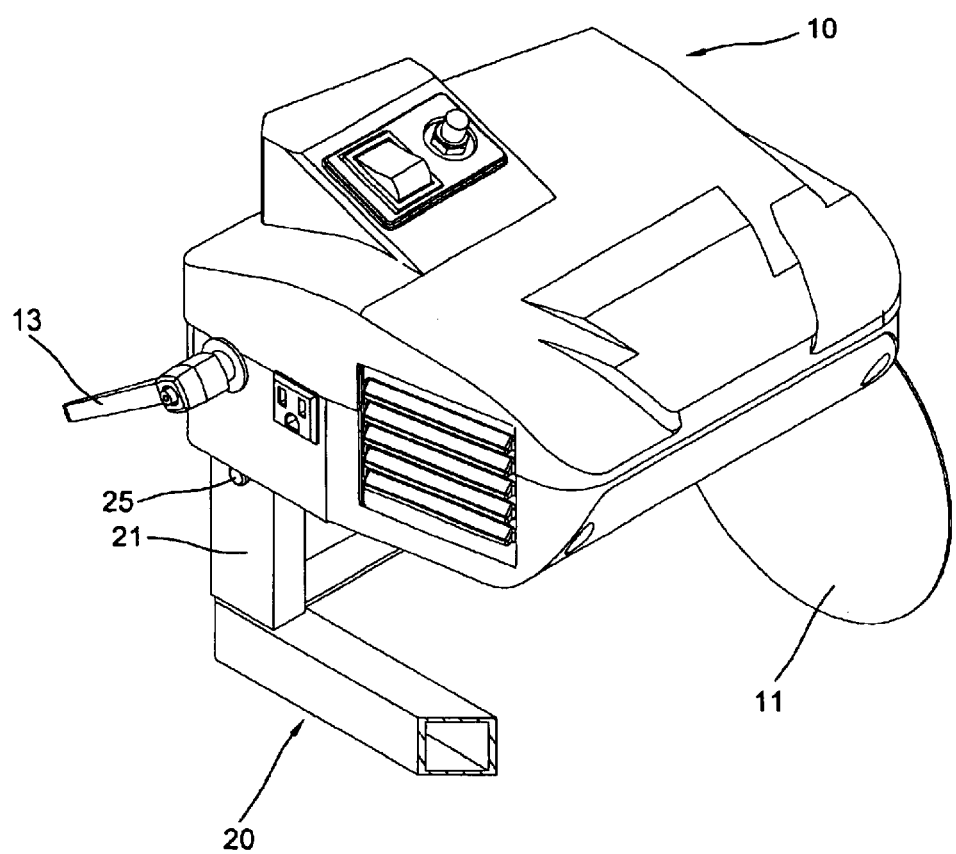
FIG. 2 is a perspective view to show the assembly of FIG. 1.
Figure 3:
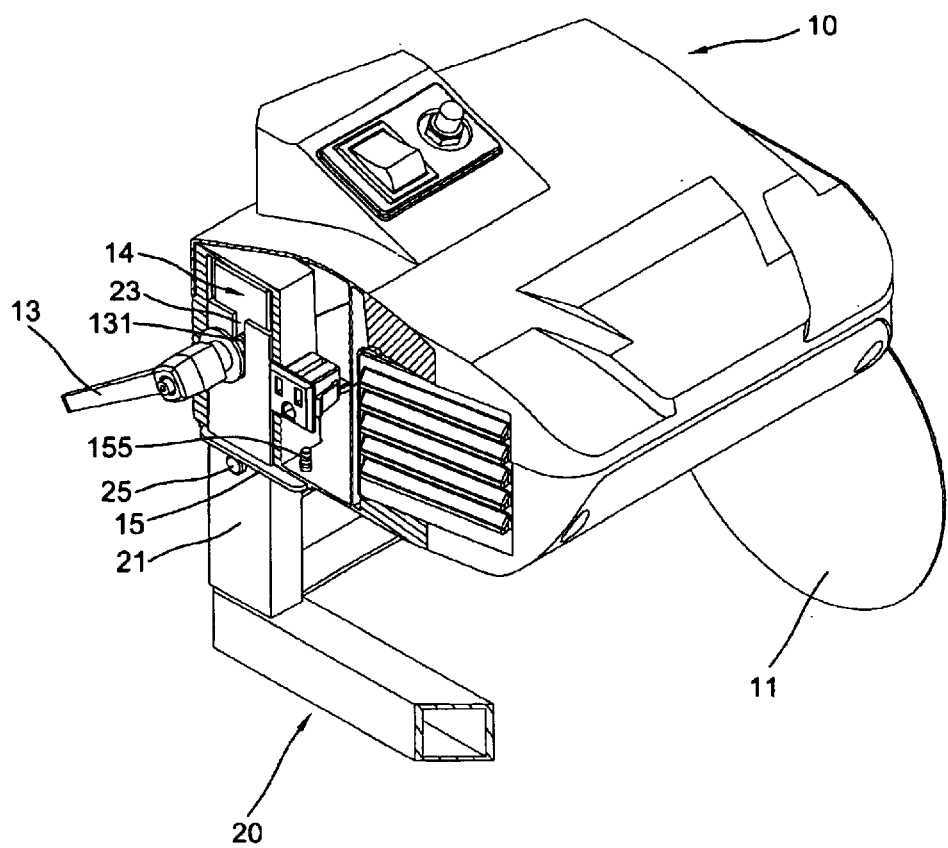
FIG. 3 is a perspective view and partially sectional view of FIG. 2.

With reference to FIGS. 1, 2 and 3 of the drawings, the cutting mechanism minute adjustment device for a stone cutter of the present invention comprises a cutting mechanism 10 and a framed base 20.

The cutting mechanism has a circular blade 11 on a right side connected to an axis of a motor inside the mechanism (not shown), a screw hole 12 in a left side thereof communicating to a rectangular receiving space 14 in an underside.

Figure 5:
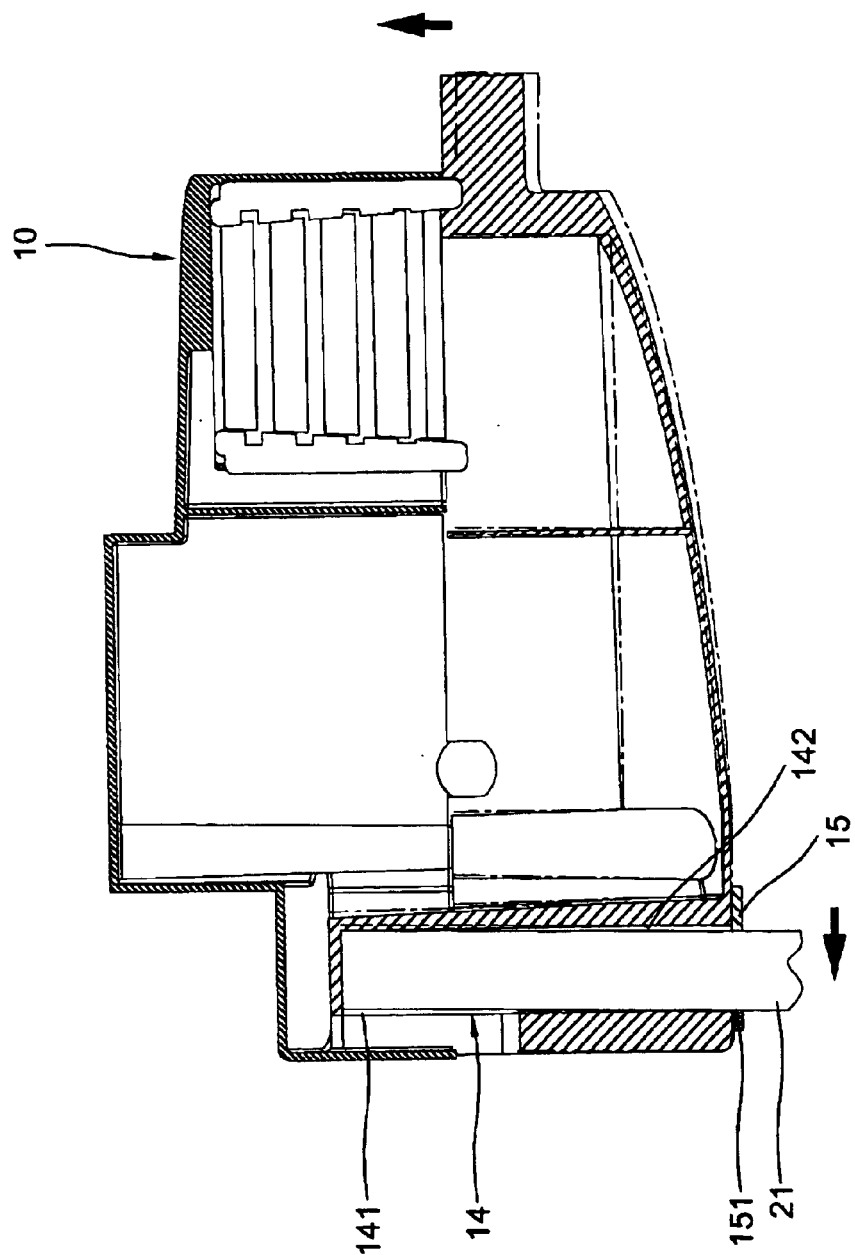
FIG. 5 is a sectional view of FIG. 4.

A hollow interior rectangular support arm 21 projects upward from a front left corner of the base 20 and inserts into the rectangular receiving space 14 of the cutting mechanism 10 (as shown in FIGS. 3 and 5). The hollow interior rectangular support arm 21 has a U-shaped slit 23 in the top of an outer side wall engageable with the screw hole 12 of the cutting mechanism 10 and a screw hole 22 in a middle portion of the same wall. A sustaining plate 24 inserts into the support arm 21 having a transverse portion 242 on the top and a screw hole 241 in a middle portion engaged with the screw hole 22 of the support arm 21 and secured by a screw 25. When the support arm 21 inserts into the rectangular receiving space 14 of the cutting mechanism 10, a roughly L-shaped adjustment plate 15 is engaged therebetween and releasable fastens by a lock which has a threaded shank 131 engaged with the screw hole 12 and the U-shaped slit 23 and a swivel handle 13 with a washer 132 engaged therebetween. The L-shaped adjustment plate 15 has rectangular through hole 151 for permitting the support arm 21 to pass through and a pair of adjustable slots 152 and 153 spacedly formed and respectively secured by a pair of screws 154 and 155 to a pair of screw holes under the cutting mechanism (not shown). The transverse portion 242 of sustaining plate 24 stops against the shank 131.

Figure 4:
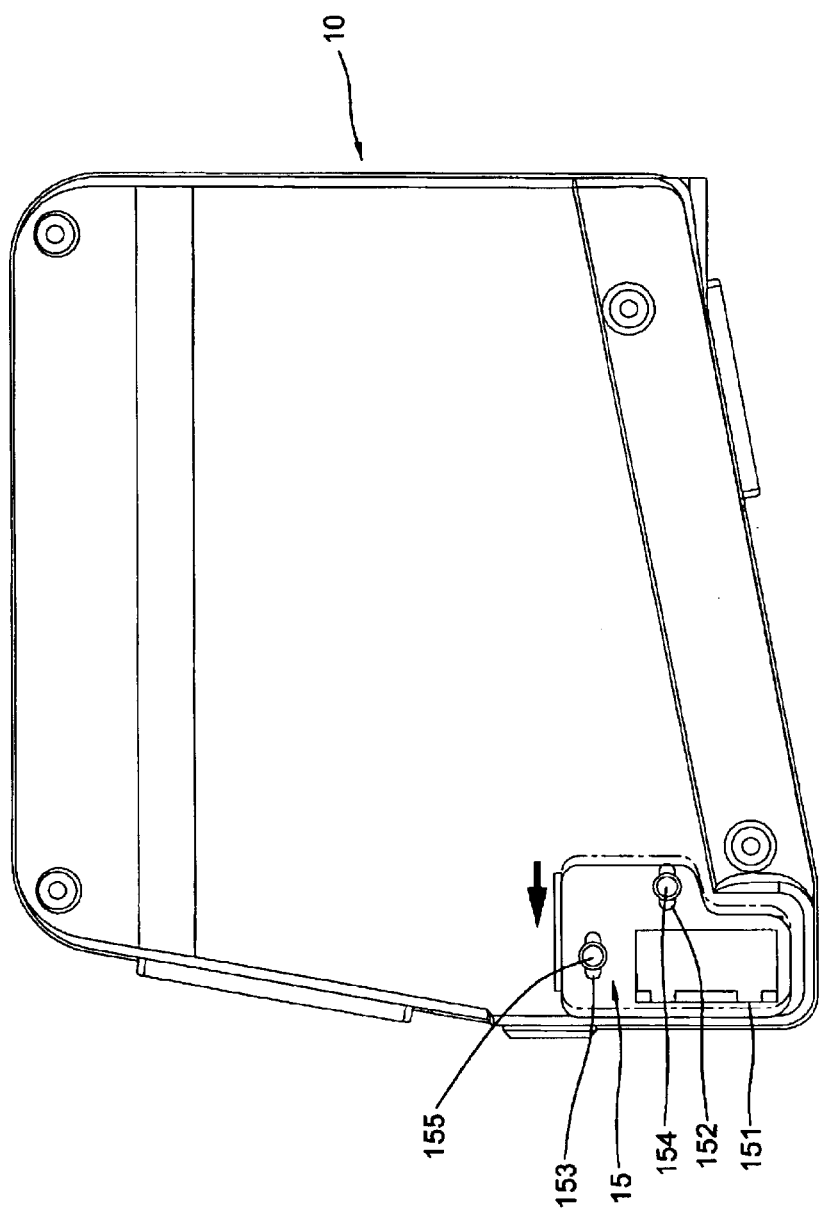
FIG. 4 is a plane view looking from the underside thereof to show that the adjustable plate is moving leftward.
Figure 6:
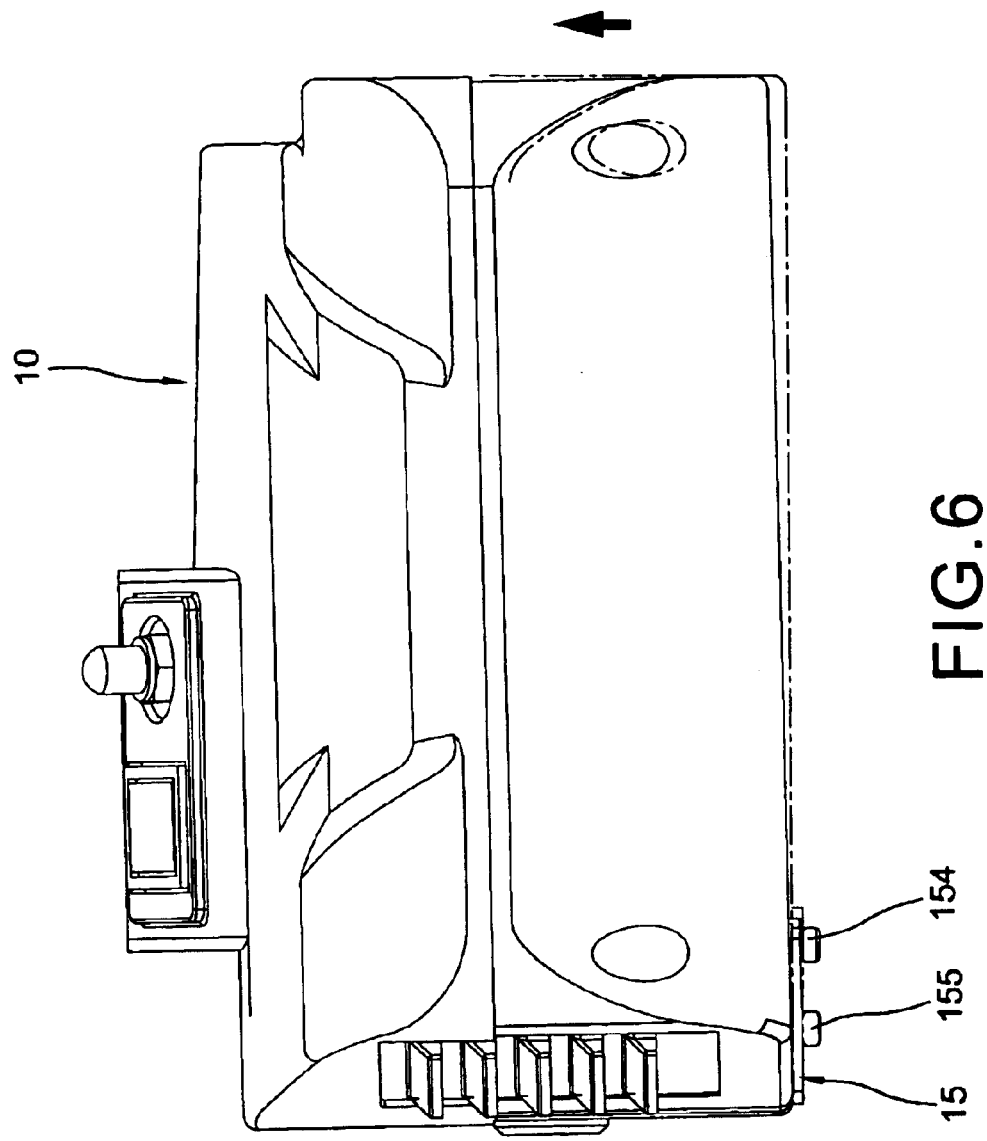
FIG. 6 is a plane view to show that the right side of the cutting mechanism is moving upward when the adjustable plate is moved leftward.

Referring to FIGS. 4, 5 and 6, when the screws 154 and 155 are in a loose state, move the adjustment plate 15 leftward (from the dotted line to the solid line) and the rectangular hole 151 is also moved a slight leftward. Where the upper left side as well as the lower right side of the rectangular receiving space 14 create a small gap 141 and 142. So that the right side of the cutting mechanism 10 lifts a small angle. Then fasten the screws 154 and 155 the cutting mechanism 10 together with the blade 11 are slantwise calibrated.

Figure 7:
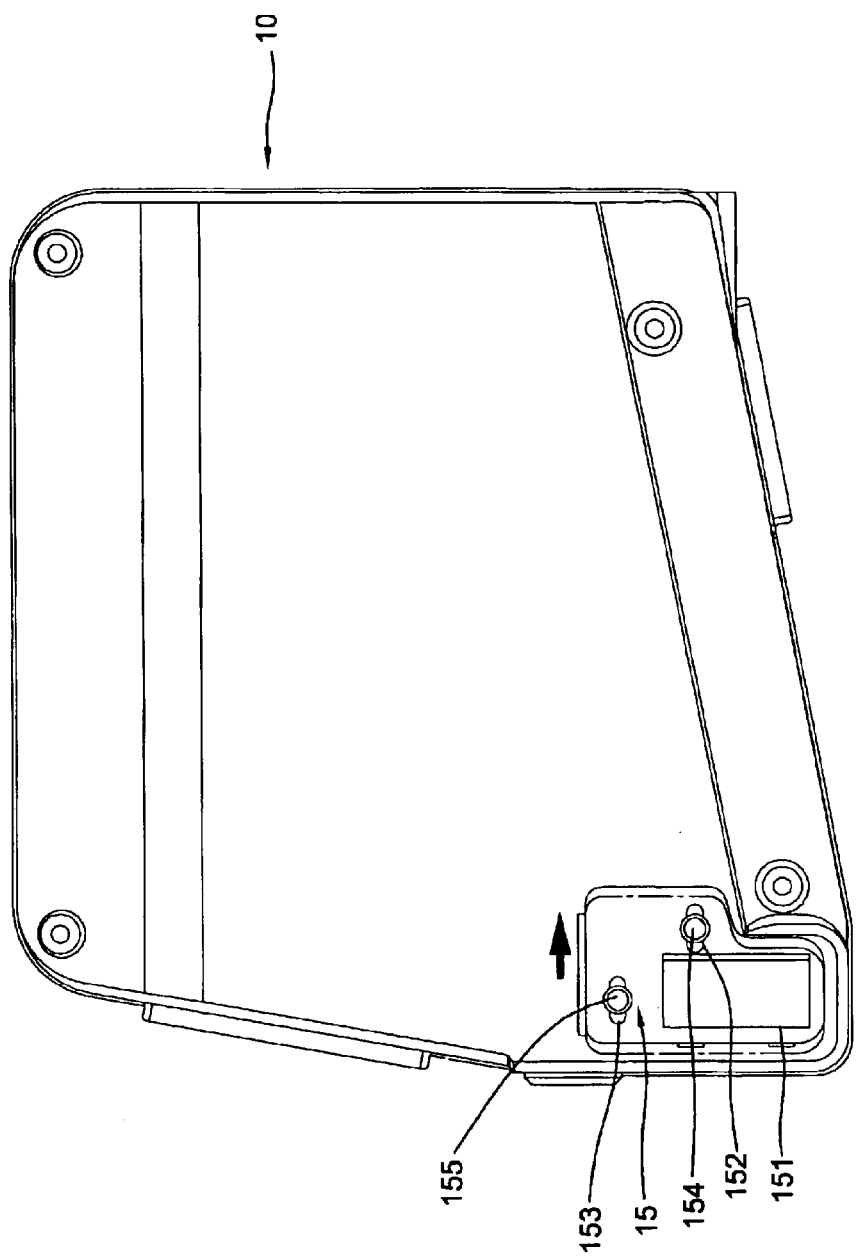
FIG. 7 is a plane view looking from the underside thereof while the adjustable is moving rightward.
Figure 8:
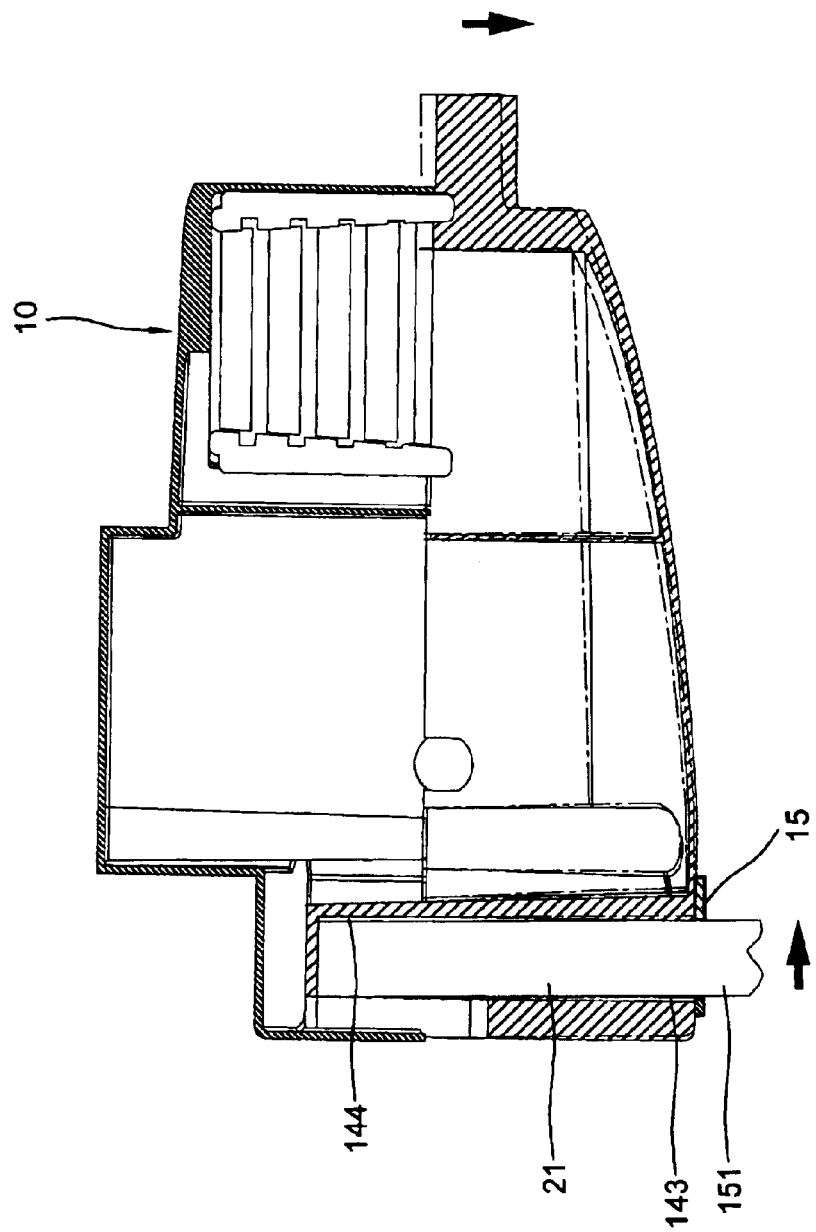
FIG. 8 is a sectional to show the rightward movement of the adjustable plate.
Figure 9:
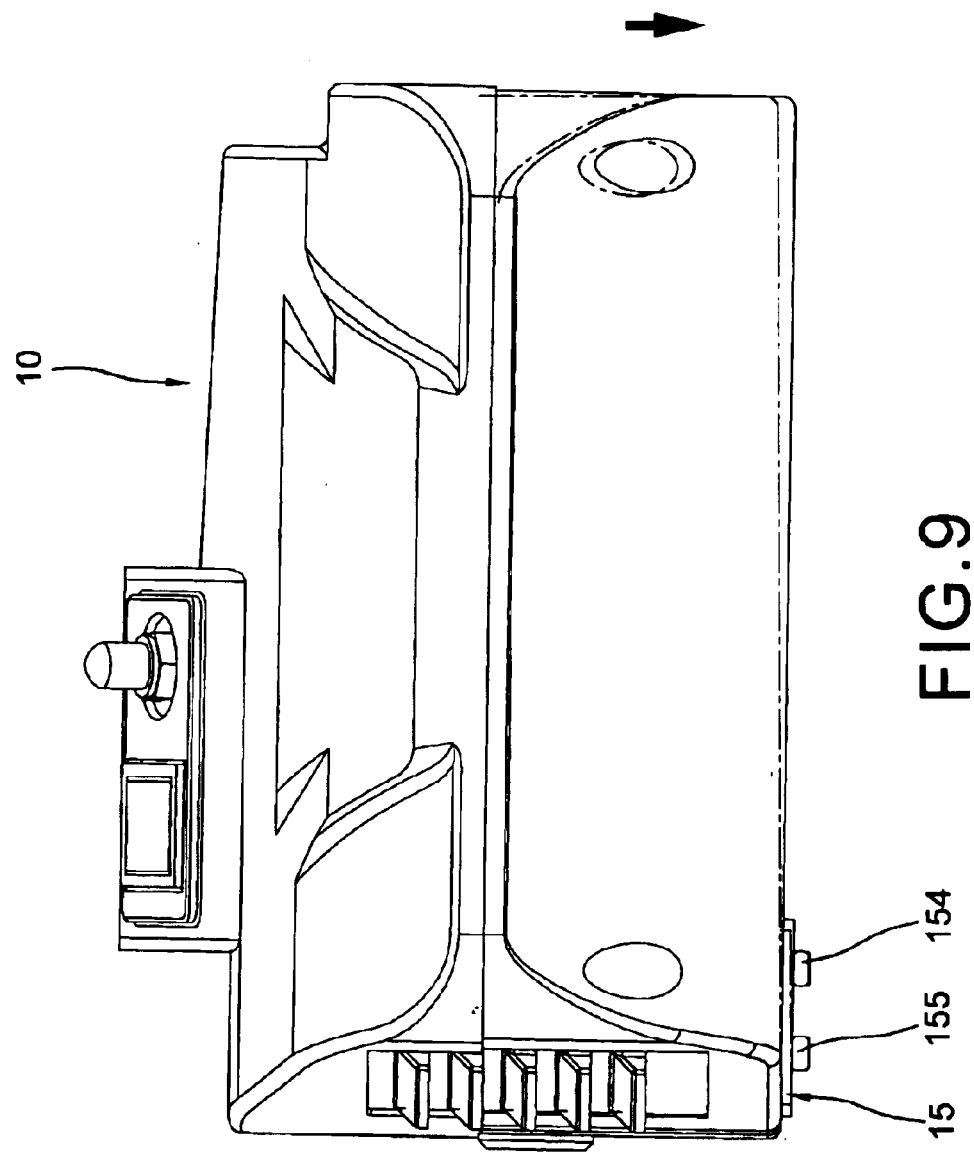
FIG. 9 is a plane view to show that the right side of the cutting mechanism is moving downward when the adjustable is moved rightward.

Referring to FIGS. 7, 8 and 9, if loosens the screws 154 and 155 and moves the adjustment plate 15 slightly rightward (form the dotted line to the solid line). The upper right side as well as the lower left side of the rectangular receiving space 14 create a small gap 143 and 144 and the right side of the cutting mechanism moves slightly downward to a desired slant angle such that the cutting mechanism 10 together with the blade 11 are calibrated.

The minute adjustment function of the present invention aims to rectify the error in the rectangular receiving space 14 created during the manufacturing stage and rapidly and conveniently adjusts the error position of the blade 11 to be exactly vertical.

Note that the specification relating to the above embodiment should be construed as an exemplary rather than as a limitative of the present invention, with many variations and modifications being readily attainable by a person of average skill in the art without departing from the spirit or scope thereof as defined by the appended claims and their legal equivalents.

I claim:

1. A cutting mechanism minute adjustment device for stone cutter comprising:

a framed base having a hollow interior support arm projected upward from a front left corner which includes a U-shaped slit in a central top of an outer wall, a first screw hole in a central middle portion of said wall and a sustaining plate inserted into said support arm including a transverse portion on top and a second screw hole in a central middle portion engaged with the first screw hole and secured by a first screw;

a cutting mechanism having a circular blade on a right side connected of an axis of motor inside said cutting mechanism, a pair of third screw holes and rectangular receiving space formed spaced apart in an underside adjacent left side thereof and a fourth screw hole in a left side communicating with said rectangular receiving space which wraps onto said support arm of said framed base with a L-shaped adjustable plate engaged therebetween, said L-shaped adjustable plate having a pair of adjustable slots spacedly and alternately form and respectively engaged with the pair third screw holes under said cutting mechanism and releasably secured by a pair of second screws and a rectangular through hole in the body for passing through said support arm;

a lock having a threaded shank on front engaged into said fourth screw hole of said cutting mechanism and said U-shaped slit of said support arm and stopped against a top of the transverse portion of said sustaining plate with a washer disposed therbetween and a swivel handle on a lateral side thereof;

whereby, slides said L-shaped adjustable plate left and/or rightward, said cutting mechanism together with said circular blade will move up and down to adjust said blade to be exactly vertical.

* * * * *